March 7, 1933. D. FERGUSSON 1,900,439
MOTOR VEHICLE
Filed Sept. 8, 1931 4 Sheets-Sheet 3

INVENTOR
David Fergusson
BY Edward H. Cumpston
his ATTORNEY

March 7, 1933. D. FERGUSSON 1,900,439
MOTOR VEHICLE
Filed Sept. 8, 1931 4 Sheets-Sheet 4
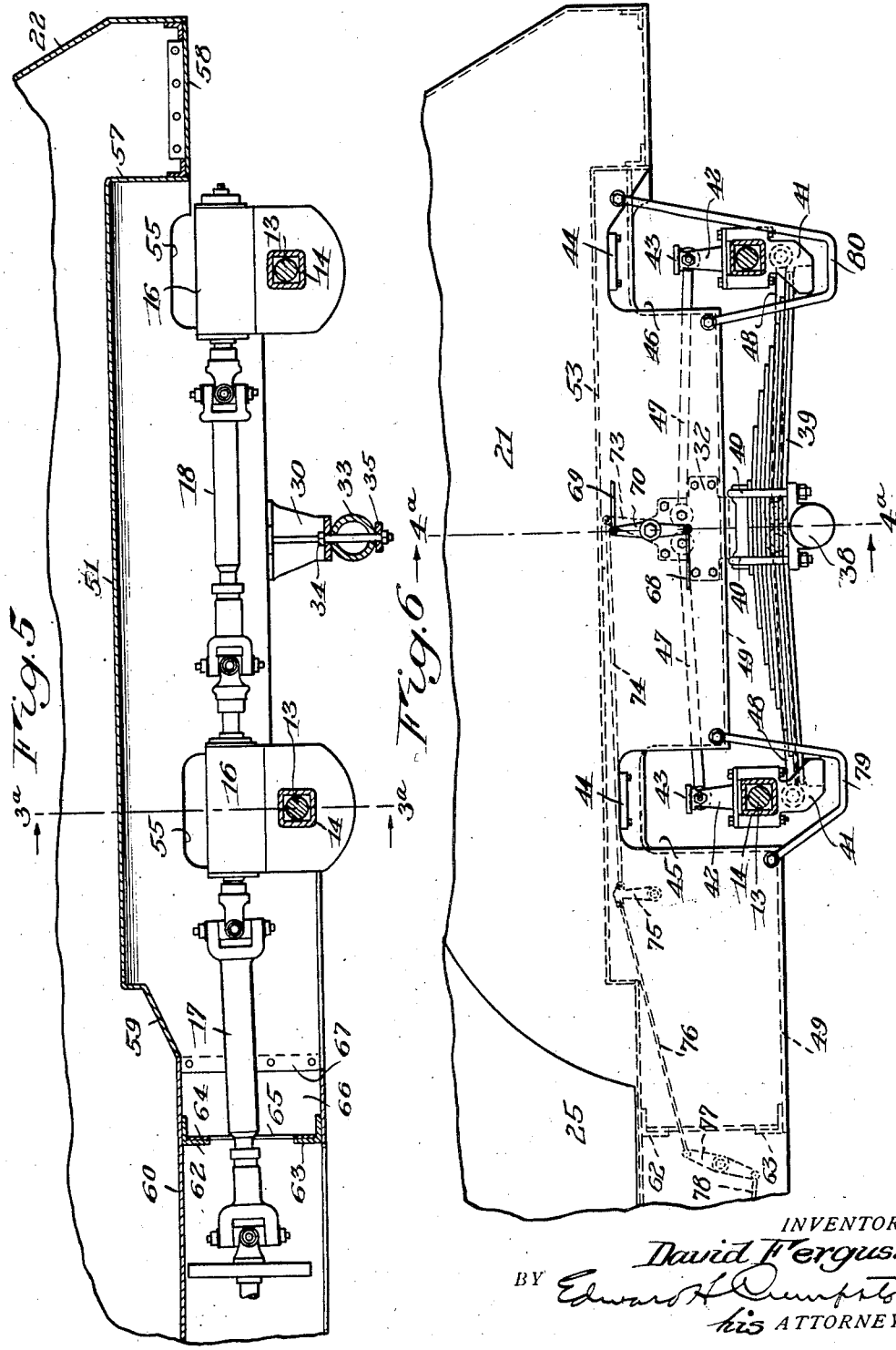
INVENTOR
David Fergusson
BY Edward H. Crumpton
his ATTORNEY Patented Mar. 7, 1933

1,900,439

UNITED STATES PATENT OFFICE

DAVID FERGUSSON, OF ROCHESTER, NEW YORK, ASSIGNOR TO JAMES CUNNINGHAM, SON & COMPANY, OF ROCHESTER, NEW YORK, A CORPORATION OF NEW YORK

MOTOR VEHICLE

Application filed September 8, 1931. Serial No. 561,589.

The present invention relates to motor vehicles and has for its object to provide improvements in vehicles of this class by which the body of the vehicle is brought to an extremely low position with respect to the wheels, whereby to afford a low center of gravity and increased stability in vehicles generally, as well as to reduce visibility and exposure of vehicles used for military purposes.

More specifically stated, it is an object to provide an improved vehicle body and supporting means therefor by which the usual chassis or under-frame construction is eliminated and the floor of the body is arranged to lie in a plane below the upper limits of movement of one or more of the axles by which the body is supported, as well as below the plane of the driving shaft for the axles and other operating parts associated with the body.

A further object of the invention is to provide improved supporting means for the body interposed between the latter and certain of the wheels and axles upon which the body is mounted.

A still further object is to provide a motor vehicle particularly adapted for military use, such as an armored car, having the above advantages including the location of the gunner's compartment and floor at the lowest level, to reduce the over-all height and visibility of the car, as well as the exposure to injury by projectiles.

To these and other ends the invention resides in certain improvements and combinations of parts, all as will be hereinafter more fully described, the novel features being pointed out in the claims at the end of the specification.

In the drawings:

Fig. 3 is a transverse sectional elevation taken substantially on the line 3a—3a of Fig. 5;

Fig. 4 is a transverse sectional elevation taken substantially on the line 4a—4a of Fig. 6;

Fig. 5 is a longitudinal sectional elevation taken on the line 5a—5a of Fig. 2;

Fig. 6 is a sectional elevation taken on the line 6a—6a of Fig. 2;

Fig. 7 is a fragmentary side elevation showing the manner of connecting the sills of the engine-supporting frame with the side walls of the body of the vehicle, and Fig. 8 is a vertical section taken on line 8a—8a of Fig. 7.

Similar reference numerals throughout the several views indicate the same parts.

Figure 1:
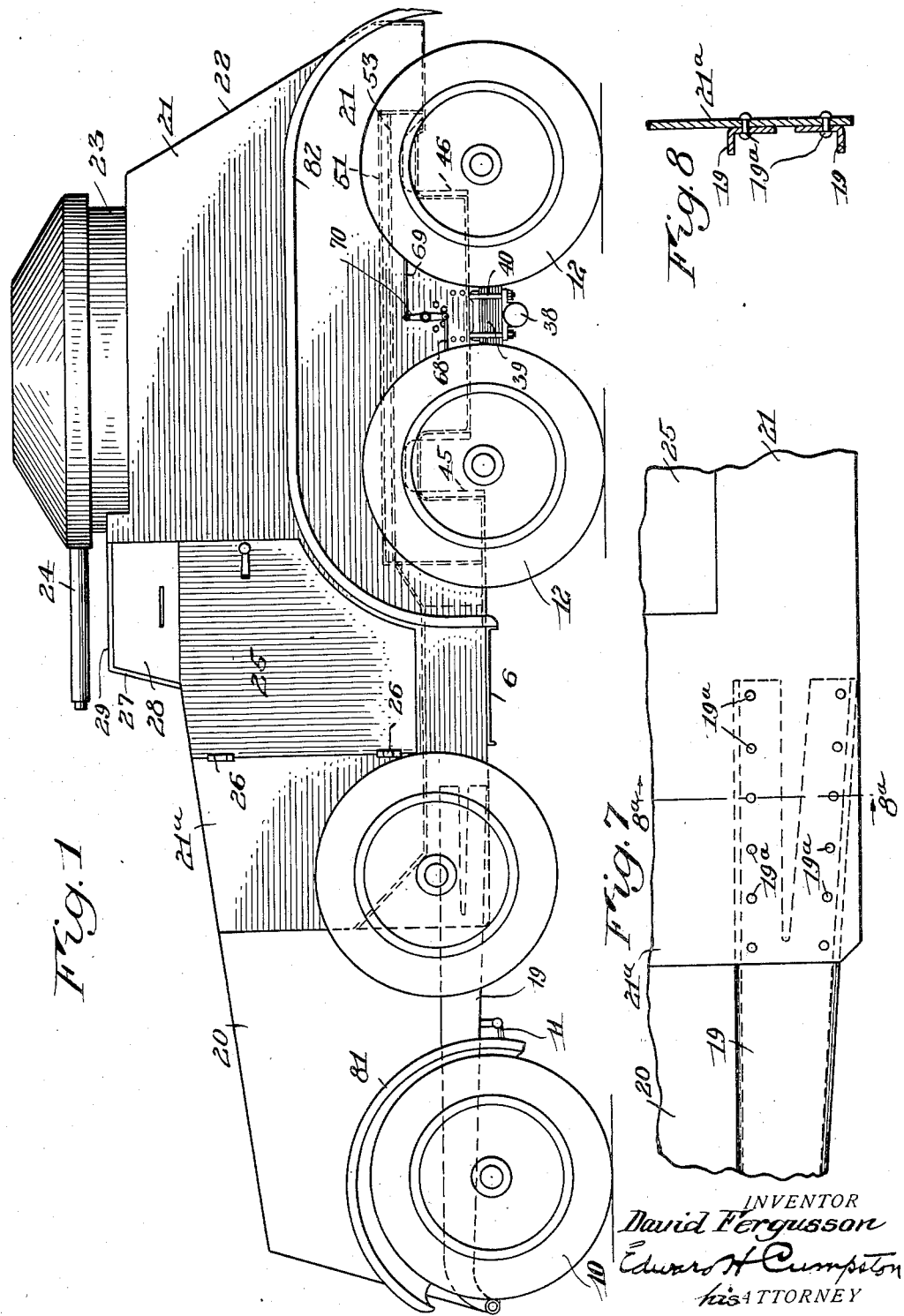
Fig. 1 is a side elevation of an armored car embodying the invention.

The invention is disclosed in the present instance as embodied in an armored car, but it will be understood, of course, that this embodiment is described merely by way of illustration and not in any limiting sense.

Referring to the drawings, the front wheels 10 of the vehicle, the axle connecting the same and the springs 11 thereon for supporting the front end of the body are of the usual or well known type.

At the opposite end of the body two sets of traction wheels 12 are provided for carrying the relatively heavy load of the armored gunner's compartment, these wheels having the usual axles 13 journaled in the housings 14 which carry at their opposite ends suitable brake drums 15.

The drive for the axles is preferably of the worm gear type, the driving worms being enclosed in casings 16 overlying and supported by the housing 14, as shown in Figs. 3 and 5. The worms are driven by a flexible drive shaft comprising front and rear sections 17 and 18, respectively, each of which is of the usual telescoping type, the front section being connected with the crank shaft of the engine in the usual or any preferred manner.

The engine, not shown, is carried by a short supporting frame including side sills 19 connected with and supported at its front end by the springs 11 secured upon the front axle in the usual manner. The engine is protected by a suitable hood 20 of any preferred design.

The body of the vehicle is formed of relatively heavy armor plate and includes the oppositely disposed side plates 21 connected by a rear end wall 22 and a top wall, not shown, upon which is rotatably mounted a turret 23 provided with one or more machine guns 24 or other types of firearms as may be preferred. Any suitable means, not shown, may be provided for rotating the turret which can be conveniently located within the gunner's compartment. It will be understood that the turret is also formed of armor plate which, like the walls of the body is of suitable thickness to provide protection against machine gun bullets and other light projectiles. The side walls 21 are provided with doors 25 which are also formed of armor plate and which are hinged at 26 to the front ends 21a of the side walls which terminate at the rear end of the hood 20, as indicated in Fig. 1. The doors are disposed opposite the seat occupied by the driver of the vehicle who is protected by a suitable overhead construction comprising front and side walls 27 and 28, respectively, an overlying wall 29 forming a roof for the driver's compartment as shown in Fig. 1. The front and side walls 27 and 28 may be of any suitable design which will permit the driver of the vehicle to obtain a proper view. If preferred the front and side walls 27 and 28 may be hinged at their upper edges so that they can be swung to a substantially horizontal position when desired.

The compartment occupied by the driver preferably constitutes a continuation of the gunner's compartment and the entrance to the gunner's compartment is preferably through the driver's compartment.

The front or engine supporting frame is directly connected with the forward ends 21a of the side walls of the body, preferably by an overlapping joint in which the rear ends of the sills 19 are secured to the side walls as by means of rivets 19a, whereby a rigid connection is afforded. Preferably the side sills are split and spaced apart at their rear ends as shown by dotted lines in Fig. 7, whereby to increase the depth of the joint between the sills and body plates.

The side walls of the body are extended downwardly to a relatively low point with respect to the axles of the traction wheels 12 and are tied together at a point between the axes of said wheels by a transverse connection 30, which is preferably in the form of a bolster, the construction of which is best shown in Fig. 4. The bolster is provided adjacent its ends with upwardly inclined portions 31 carrying vertically disposed end flanges 32 which are suitably connected with the body walls 21, as by means of rivets or bolts not shown.

The bolster is superimposed upon a transversely extending beam or bar 33 with which it is connected by means of bolts 34, a plate 35 being disposed at the bottom of the bar to form a suitable bearing for the nuts on the lower ends of the bolts. The bar is also connected with the bolster by means of vertically disposed brackets 36, the upper ends of which are bolted to the horizontal portion 37 of the bolster, as shown in Fig. 4, and the lower ends of which are suitably connected with the bar 33.

Upon the extremities of the bar 33 are provided spring seats 38 on each of which rests a leaf spring 39 which is secured upon the seat by a pair of U-shaped clamping bolts 40, as shown in Figs. 4 and 6. The opposite ends of the springs are disposed in pockets formed in arms 41 suitably connected with and depending from the axle housings 14 as shown in Fig. 6. The lower arms 41 also serve as supports for the upwardly extending arms 42 which carry bearing portions 43 for engagement with cushioning blocks 44 suitably connected with the side walls of the body at points above the front and rear cutout portions 45 and 46 respectively of said walls, as indicated in Fig. 6. It will be understood that the bearings 43 will contact with said blocks only upon extreme relative movement between the axles and body one toward another.

At the sides of the body upper and lower pairs of radius rods 47 and 48 are disposed adjacent each end of the bolster, the upper rods 47 having their outer ends pivotally connected with the upper arms 42 and their inner ends pivotally connected with lugs 32a extending inwardly from the vertical end portions 32 of the bolster, as shown in Fig. 4. The lower radius rods 48 have their outer ends pivotally connected with the lower arms 41 and their inner ends pivotally connected with the lugs 36a on the brackets 36 as best shown in Fig. 4. The radius rods constitute a well known parallel motion means for properly controlling the movements of the axles on which the traction wheels are mounted, and operate in the usual manner for the purpose of maintaining and guiding the axles in parallel relation.

The floor of the body is so constructed as to occupy a position below the upper limits of movement of the axles and of the drive shaft for the axles as well, thus permitting the body to be lowered to a very considerable degree so that the overall height from the ground to the top of the vehicle is reduced to a minimum whereby the center of gravity is lowered to increase stability of the car and the danger from exposure to gun fire is greatly diminished. This is accomplished by eliminating the usual chassis or underframe and providing the floor with inwardly disposed tunnels or recess portions for receiving the axles and the drive shaft therefor and other suitable parts also, as described hereinafter. The floor is formed of longitudinally extending plates 49, Fig. 4, which are provided with upwardly extending portions 50 on opposite sides of the drive shaft, said portions 50 being connected by an inverted channel 51 cooperating with the portions 50 to afford what may be termed a tunnel in which the drive shaft is free to move upon relative movement between the axles driven by said shaft and the body of the vehicle.

Longitudinally extending side tunnels are also provided which are arranged to receive the upper radius rods and certain parts of the brake mechanism described hereinafter. The side tunnels are formed of vertically disposed plates 52 extending upwardly from the floor plates 49 and having horizontally disposed portions 53 which are suitably connected with the side walls 21 of the body at points above the ends 32 of the bolster, as best shown in Figs. 3 and 4. Openings 54 are formed in the plates 52 at points opposite certain parts of the brake mechanism, said openings being normally closed by removable cover plates 54, shown in Fig. 4.

The transversely extending tunnels for receiving the axle housings 14 are in the form of inverted channels 55 overlying the housings and extending between and connected with the walls of the central drive shaft receiving tunnel and those of the side tunnels located at the opposite sides of the body. The transverse axle receiving tunnels are preferably provided with flanged portions 56 at their opposite ends which engage and are secured upon the vertical walls 50 and 52 of said central and side tunnels respectively, as best shown in Fig. 4. The tunnels described above constitute relatively narrow upwardly extending recess portions formed in the floor for receiving the parts specified and serve as bracing and strengthening means for the floor sections 49 which overlie the horizontal portions of the bolster and which are preferably supported thereby.

In order to afford ample clearance for the axle drive shaft the upper horizontal portion of the bolster is cut away at its center to an extent substantially equal to the width of the central tunnel as shown in Fig. 4, so that said driving shaft will be free to move to a point somewhat below the level of the floor when the shaft and body are approaching their limits of movement in one direction.

It will be seen, therefore, that by reason of the extreme low position of the floor plates upon which the gunner stands during control of the armament, that he is brought relatively close to the ground and that likewise the overall height of the vehicle is greatly reduced whereby the danger of damage to the machine or to the operating crew by fire from the enemy is considerably diminished.

Figure 2:
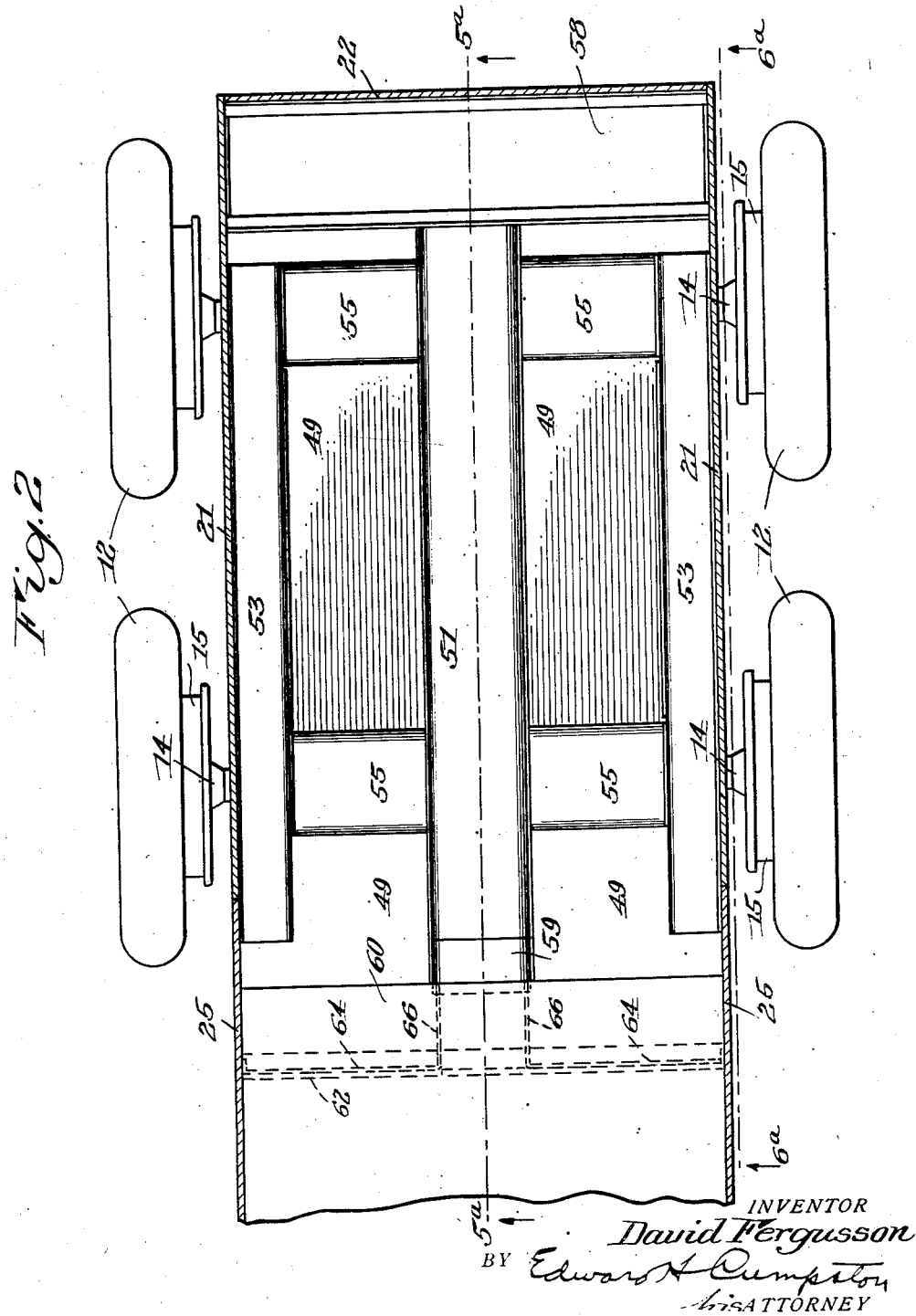
Fig. 2 is a sectional plan of the same.

The central longitudinally extending inverted channel is provided at its rear end with a closing wall 57 which is connected with the rear wall 22 of the body by a horizontally disposed plate 58, Fig. 5. The front end of the inverted channel is preferably inclined downwardly as indicated at 59 and abuts the rear edge of a floor plate 60 disposed somewhat above the floor plates 49. The plate 60 is connected with a transversely extending bottom plate 61 by means of upper and lower angle irons 62 and 63 respectively, which are suitably secured to a vertically disposed tie plate 64 extending between and suitably connected with the side walls 21 of the body. The tie plate 64 is provided with an opening 65 for the passage of the front section 17 of the axle drive shaft, as shown in Fig. 5. The tie plate has rearwardly extending members 66 which are suitably connected with the vertically disposed end portions 67 of the central inverted floor channel as shown in Figs. 2 and 5.

The brake mechanism for the rear traction wheels may be of any preferred design. The brakes proper are not shown but those of the front and rear traction wheels are operated respectively by rods 68 and 69 which in turn are operated by a lever 70, Figs. 4 and 6, which is fixed on a shaft 71 extending through the side wall 21 of the body and journaled in a bearing 72 which is preferably formed integral with the vertical end portion 32 of the bolster 30 and which projects into the longitudinally extending side tunnel, as shown in Fig. 4. The shaft has an arm 73 connected therewith which is pivotally connected with a brake rod 74 extending forwardly within the side tunnel as shown by dotted lines in Fig. 6. The rod is connected at its front end with a rocker 75 suitably supported within the side tunnel and from which extends an operating rod 76 arranged to be actuated by a lever 77 which in turn is operated by a rod 78 which extends forwardly and is suitably connected with the foot pedal for operating the brakes, not shown. It will be seen, therefore, that the longitudinally extending side tunnels serve to protect the brake parts disposed therein from injury by gun fire and that the brake parts located in advance of the tunnels are also protected by being disposed rearwardly of the armored side walls of the vehicle.

As shown in Fig. 6 the sides of the body are provided with front and rear safety straps 79 and 80 which extend beneath the axles of the traction wheels, and prevent undue movement between the body and axles one relative to another when approaching their limits of movement in one direction.

The front and rear wheels are protected by suitable fenders 81 and 82 as shown in Fig. 1, which are connected with the body in the usual or any preferred manner.

It will thus appear from the above description and the drawings that the invention provides a practical and advantageous motor vehicle construction by which the position and over-all height of the body of the vehicle are substantially lowered, so as to lower the center of gravity and increase the operating stability without reducing the standing room in the body. Such advantages are particularly useful, for example, in an armored car to reduce the visibility and exposure to fire, although it will be understood that such advantages are applicable as well to other types of vehicles. These advantageous results are made possible by simple and yet practical structural features in the body itself and in the provisions for supporting the same on the wheels, while maintaining full spring suspension and the other desirable supporting and operating parts.

I claim as my invention:

1. In a motor vehicle, a body including a compartment, an engine supporting frame extending forwardly of and connected with the walls of said compartment, wheels having axles for supporting said body, a longitudinally extending drive shaft operatively associated with the axles, springs extending longitudinally between the axles and body, a floor for said compartment disposed in a plane above which portions of the axles are movable upon relative movement between the axles and body one toward another within the limits of movement of the spring suspension, said floor having side tunnels alined with the springs and transverse tunnels overlying the axles and arranged to receive the latter when moved above the floor level and also having a tunnel overlying said shaft and arranged to receive the latter, arms extending upwardly from the axles, and radius rods connected with said arms and extending within the side tunnels and connected with the side walls of the body.

2. In a motor vehicle, a body including side and end walls, spaced floor plates between the side walls adjacent the bottom thereof, longitudinally extending central and side tunnels extending upwardly within the body above the floor plates, spaced transversely extending tunnels located between the central and side tunnels and communicating therewith, and a bolster extending between the transverse tunnels and beneath the body in supporting engagement with the floor and having its ends extending upwardly within the side tunnels and connected with the side walls of the body therein.

3. In a motor vehicle, a body including side and end walls, a bolster extending transversely between the side walls and having its ends connected therewith, said bolster having horizontal floor supporting portions spaced apart at the center of the body and connected by a central portion below the plane of the horizontal portions, floor plates disposed upon said horizontal bolster portions, and an inverted channel extending above and overlying the space between the horizontal portions of the bolster.

4. In a motor vehicle, a body forming a compartment and having its side walls connected by a transversely extending bolster having a horizontally disposed floor supporting portion, a floor disposed upon the horizontal portion of the bolster, wheels having axles extending beneath said compartment on opposite sides of the bolster, a drive shaft for the axles extending longitudinally of said compartment, a longitudinally disposed tunnel for the drive shaft extending above the floor level, and transverse tunnels for the axles extending above the floor level, said tunnels comprising inverted channels within which said shaft and axles are free to move upon relative movement of the wheels and body in a vertical direction.

5. In a motor vehicle, a body including side walls, wheels and axles for supporting the body, housings for the axles, a drive shaft extending longitudinally of the body and operatively associated with the axles, a floor for the body having an inverted channel overlying the drive shaft and extending longitudinally thereof, transversely extending channels overlying the axle housings above the plane of the floor between said inverted channel and the side walls of the body, a bolster for supporting the body extending transversely therebeneath in engagement with the floor and between the axle housings, a transverse support for the bolster extending beneath the same and springs connected with said transverse support adjacent the extremities thereof and having their ends extending at opposite sides thereof and connected with the axle housings.

6. In a motor vehicle, an armored body including side walls, wheels and axles for supporting the body, housings for the axles, a drive shaft extending longitudinally of the body and operatively associated with the axles, a floor for the body having an inverted channel overlying the drive shaft and extending longitudinally thereof above the plane of the floor, longitudinally extending tunnels located at the bottom of the side walls adjacent thereto and above the plane of the floor, transversely extending channels overlying the axle housings between the inverted channel and said tunnels, supporting means for the body extending therebeneath, and suspension means interposed between said supporting means and the housings of the axles.

7. In a motor vehicle, a body, wheels and axles for supporting the body, housings for the axles, a drive shaft extending longitudinally of the body and operatively associated with the axles, a longitudinally extending inverted channel overlying the drive shaft and extending upwardly within the body, floor plates connected with and disposed below the top of said channel on opposite sides thereof, a bolster extending beneath the floor plates and connected with the body, and supporting means for the bolster carried by the axle housings.

8. In a motor vehicle, a body including side and bottom walls, a bolster extending transversely between the side walls and having a horizontal portion extending beneath and forming a support for said bottom wall, the ends of the bolster being connected with the side walls of the body, said bottom wall comprising floor plates spaced apart at the center of the body, an inverted channel extending above and overlying the space between said floor plates and forming a tunnel for receiving a longitudinally extending axle drive shaft, and longitudinally extending plate members cooperating with the side walls at points above and adjacent the floor plates to afford side tunnels spaced from said inverted channel.

9. In a motor vehicle, a body including side and end walls, a bolster extending transversely beneath the side walls and having its ends connected therewith, said bolster having horizontal floor supporting portions spaced apart at the center of the body and connected by a central portion below the plane of the horizontal portion, floor plates disposed upon said horizontal bolster portions, an inverted channel extending above and overlying the space between the horizontal portions of the bolster, longitudinally extending plate members cooperating with said side walls to afford side tunnels above the plane of the floor, and transversely extending tunnels between the side tunnels and said inverted channel, said transversely extending tunnels being disposed on opposite sides of the bolster.

10. In a motor vehicle, a body including side and end walls, a bolster extending transversely between and connected with the side walls and having horizontal floor supporting portions, floor plates disposed upon said horizontal bolster portions, transversely extending inverted channels on opposite sides of the bolster connected with the floor plates and forming tunnels above the floor plates, a supporting element for the bolster extending beneath and connected with the bottom thereof, and vertically disposed connections between the bolster and said supporting element adjacent the ends of the latter.

11. In a motor vehicle, a body, wheels and axles for supporting the body, housings for the axles, a supporting element extending transversely beneath the body between the axle housings, a spring connected with each end of said element and extending on opposite sides thereof, the ends of said springs being connected with said housings, a transversely extending bolster overlying the supporting element beneath the body having its ends connected with the side walls of the body and connected intermediate its ends with said supporting element, and a floor for the body disposed upon said bolster.

12. In a motor vehicle, a body having side and bottom walls, wheels and axles for supporting the body, housings for the axles, a bolster extending beneath the body between the axle housings and having its ends connected with the side walls of the body, a supporting element for the bolster extending beneath and longitudinally of the bolster, a spring mounted on each end of said supporting element and extending on opposite sides thereof, upper and lower arms carried by the axle housings adjacent the outer ends of the latter, said lower arms receiving the ends of said springs, and two pairs of radius rods adjacent each end of the bolster, one pair having its inner ends connected with the bolster and its outer ends connected with said upper arms and the other pair having its inner ends connected with said bolster-supporting element and its outer ends connected with the lower arms of the axle housings.

13. In a motor vehicle, a body, wheels and axles for supporting the body, a floor for the body relative to which the wheels and axles are movable, said floor being disposed in a plane below the upper limits of movement of the axles and having transversely extending recess portions for receiving the axles when the latter are above the plane of the floor, longitudinally extending tunnels at the sides of the body above the plane of the floor, a transversely extending supporting structure for the body extending beneath the floor and connected with the sides of the body, a spring suspension interposed between said structure and the axles, and upper and lower sets of radius rods at each side of the body, the upper radius rods extending within said tunnels and having their inner ends connected with the body and their outer ends connected with the axles and the lower radius rods having their inner ends connected with said supporting structure and their outer ends connected with the axles.

14. In a motor vehicle, a body, wheels and axles for supporting the body, a floor for the body relative to which the wheels and axles are movable in a vertical direction, said floor being disposed in a plane below the upper limits of movement of the axles and having transversely extending recessed portions for receiving the axles when the latter are above the plane of the floor, longitudinally extending tunnels at the sides of the body above the plane of the floor, a transversely extending supporting structure for the body extending beneath the floor and connected with the sides of the body, a spring suspension interposed between said structure and the axles, arms extending upwardly from the axles, and radius rods within each of the side tunnels and each being connected at one end with one of the upstanding axle arms and connected at the opposite end with said body.

15. A motor vehicle body comprising side walls, a bolster extending transversely beneath and connected with the side walls and having horizontal floor supporting portions, floor plates disposed upon said horizontal bolster portions, an inverted channel extending longitudinally of the body above the floor plates and the bolster to form a tunnel between the sides of the body, longitudinally extending plate members cooperating with the side walls to afford side tunnels above the plane of the floor, and transversely extending tunnels overlying the floor plates between the side tunnels and said inverted channel and having their ends secured upon the vertical walls of said channel and said longitudinally extending plate members.

16. A motor vehicle body comprising side walls, a bolster extending transversely between the side walls and having its ends connected therewith, said bolster having horizontal floor supporting portions spaced apart at the center of the body and connected by a central portion below said horizontal portions to afford an opening below the plane of the floor, floor plates disposed upon said horizontal bolster portions, an inverted channel overlying said opening and communicating therewith, said channel being connected with the floor plates above the bolster and extending longitudinally of the body, and side tunnels above the floor plates each formed by horizontally and vertically disposed plate members connected respectively with one of the side walls of the body and one of said floor plates.

17. A motor vehicle body having side walls, floor plates having their inner edges spaced apart at the center of the body and their opposite edges terminating short of the side walls of the body, an inverted central channel projecting upwardly from the inner edges of the floor plates and extending longitudinally of the body to afford a receiving tunnel for an axle drive shaft, plates extending upwardly and outwardly from the outer edges of the floor plates to the side walls and cooperating with said walls to afford longitudinally extending side tunnels, and transversely extending inverted channels above the floor plates between said central channel and the side tunnels whereby to form axle receiving tunnels, the side walls at points opposite the outer ends of the axle receiving tunnels having openings therein for accommodating the ends of the axle upon relative movement of the body and axle in a vertical direction, and a bolster extending beneath the floor plates with its ends traversing the side tunnels and connected with the side walls of the body.

DAVID FERGUSSON.